US009459750B2

(12) United States Patent
Han et al.

(10) Patent No.: US 9,459,750 B2
(45) Date of Patent: Oct. 4, 2016

(54) TOUCH SCREEN PANEL AND TOUCH SCREEN-INTEGRATED DISPLAY DEVICE

(71) Applicant: LG DISPLAY CO., LTD., Seoul (KR)

(72) Inventors: Jonghyun Han, Paju-si (KR); Sejong Yoo, Paju-si (KR); Mijung Lee, Pocheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/811,519

(22) Filed: Jul. 28, 2015

(65) Prior Publication Data

US 2016/0070406 A1  Mar. 10, 2016

(30) Foreign Application Priority Data

Sep. 5, 2014  (KR) .................. 10-2014-0118412

(51) Int. Cl.
*G06F 3/044* (2006.01)
*G06F 1/16* (2006.01)
*G06F 3/041* (2006.01)
*G02F 1/133* (2006.01)

(52) U.S. Cl.
CPC ..... *G06F 3/044* (2013.01); *G06F 2203/04103* (2013.01); *G06F 2203/04111* (2013.01); *G06F 2203/04112* (2013.01)

(58) Field of Classification Search
CPC ....... G06F 3/044; G06F 1/1643; G06F 3/041
See application file for complete search history.

(56) References Cited

U.S. PATENT DOCUMENTS

| | | | |
|---|---|---|---|
| 2012/0062469 A1* | 3/2012 | Guard | G06F 3/044 345/173 |
| 2013/0127775 A1* | 5/2013 | Yilmaz | G06F 3/044 345/174 |
| 2013/0278521 A1* | 10/2013 | Kim | G06F 3/0412 345/173 |
| 2014/0070350 A1* | 3/2014 | Kim | G06F 3/0412 257/432 |
| 2014/0152580 A1* | 6/2014 | Weaver | G06F 3/041 345/173 |
| 2014/0152910 A1* | 6/2014 | Kang | G06F 1/1643 349/12 |
| 2014/0160373 A1* | 6/2014 | Hsu | G06F 3/044 349/12 |
| 2014/0198268 A1* | 7/2014 | Sugita | G06F 3/044 349/12 |
| 2014/0211102 A1* | 7/2014 | Kang | G06F 3/041 349/12 |
| 2015/0015532 A1* | 1/2015 | Choung | G06F 3/044 345/174 |
| 2015/0085206 A1* | 3/2015 | Lee | G06F 3/0412 349/12 |
| 2015/0370375 A1* | 12/2015 | Hayashi | G06F 3/044 345/174 |
| 2016/0085339 A1* | 3/2016 | Yashiro | G06F 3/044 345/174 |

FOREIGN PATENT DOCUMENTS

| | | | | |
|---|---|---|---|---|
| JP | WO 2013/157532 A | * | 10/2013 | G02F 1/133 |
| WO | WO 2013/157532 | * | 10/2013 | G02F 1/133 |

* cited by examiner

*Primary Examiner* — Lin Li
(74) *Attorney, Agent, or Firm* — Birch, Stewart, Kolasch & Birch, LLP

(57) ABSTRACT

Discussed is a touch screen panel including: a substrate; a first line electrode in a mesh pattern on the substrate; a plurality of first segment electrodes disposed on the first line electrode; a second line electrode in a mesh pattern on the substrate, and disconnected in an intersection area where the second line electrode is to intersect the first line electrode; a plurality of second segment electrodes disposed on the second line electrode; and a plurality of connection electrodes that connect the disconnected second line electrode in the intersection area, wherein the first and second line electrodes reduce resistance, and the first and second segment electrodes increase effective capacitance for sensing a touch to thereby reduce an RC-delay in the touch screen panel.

14 Claims, 10 Drawing Sheets

TOUCH SCREEN PANEL AND TOUCH SCREEN-INTEGRATED DISPLAY DEVICE

CROSS-REFERENCE TO RELATED APPLICATIONS

This application claims the priority of Korean Patent Application No. 10-2014-0118412 filed on Sep. 5, 2014, in the Korean Intellectual Property Office, the disclosure of which is incorporated herein by reference.

BACKGROUND OF THE INVENTION

1. Field of the Invention

The present disclosure relates to a touch screen panel. More specifically, the present disclosure relates to a touch screen panel that has reduced RC-delay, good visibility, good touch sensitivity and flexibility, and a touch screen-integrated display device.

2. Description of the Related Art

A touch screen penal is a device that senses a user's touch input on a display device. Such a touch screen panel is widely employed in personal handheld devices such as smart phones and tablet PCs, as well as in large display devices such as display devices placed in public facilities and smart TVs.

A typical touch screen panel is attached on the screen of a display device. Since such a touch screen panel is attached on the outer surface of the screen of a display device as an additional panel, the overall thickness of the display device is increased. As a result, the visibility of the display device may be impaired due to the increased thickness.

In order to overcome the above shortcoming, a touch screen-integrated display device of an in-cell type has been recently developed, in which a touch screen panel is integrated within a display device. But, since a touch screen-integrated display device has been developed as an in-cell type, there are several problems.

FIG. 1 is a plan view for illustrating a general touch screen panel. Referring to FIG. 1, the touch screen panel 100 includes a plurality of first touch electrodes 130 and a plurality of second touch electrodes 140 extending in different directions, and connection electrodes 170 connecting the separated first touch electrodes 130 at intersections of the first touch electrodes 130 and the second touch electrodes 140.

In order to prevent the visibility of the display device from deteriorating, the first touch electrodes 130 and the second touch electrodes 140 may be made of a transparent conductive material, such as indium tin oxide (ITO). However, a transparent conductive material has higher electric resistance than those made of metal. Accordingly, RC-delay of the touch screen panel 100 becomes higher. In addition, transparent conductive material such as ITO is less flexible than metal, and thus is not very useful for flexible display devices. Incidentally, as touch screen panels become thinner, as touch electrodes dispose closer to other electrodes in panel, parasitic capacitance is increased and accordingly, RC-delay becomes higher. Therefore, it is very difficult to reduce the thickness of a touch screen-integrated display device of an in-cell type using touch electrodes made of a transparent conductive material.

To address the shortcomings, a technique has been proposed to make the first touch electrodes 130 and the second touch electrodes 140 with metal electrodes in a mesh pattern. However, metal electrodes exhibit have a limitation of increasing area to hold capacitance for sensing touch compared to that of the plane electrodes made of a transparent conductive material, so that the touch sensitivity of the touch screen panel deteriorates. In addition, since metal materials reflect light, metal electrodes in a mesh pattern are dimly seen, i.e., so-called moiré pattern is observed. Accordingly, optical properties are impaired.

SUMMARY OF THE INVENTION

The inventors of the application have found out that the above-mentioned problems including RC-delay, visibility deterioration, poor sensing performance and low flexibility result from the natures of the transparent electrodes and the metal electrodes. In order to solve such problems, the inventors have invented a touch screen panel having a novel shape and arrangement of electrodes, and a touch screen-integrated display device using the same.

In view of the above, an object of the present disclosure is to provide a touch screen panel having low RC-delay and a touch screen-integrated display device using the same.

Another object of the present disclosure is to provide a touch screen panel having improved visibility, and a touch screen-integrated display device using the same.

Yet another object of the present disclosure is to provide a touch screen panel having improved flexibility, and a touch screen-integrated display device using the same.

Still another object of the present disclosure is to provide a touch screen panel having improved touch sensitivity, and a touch screen-integrated display device using the same.

It should be noted that objects of the present invention are not limited to the above-described object, and other objects of the present invention will be apparent to those skilled in the art from the following descriptions.

According to an aspect of the present disclosure, there is provided a touch screen panel. The touch screen panel includes a substrate, a first line electrode, a plurality of first segment electrodes, a second line electrode, a plurality of second segment electrodes, and a plurality of connection electrodes. The first line electrode is disposed in a mesh pattern on the substrate. The first segment electrodes are connected to the first line electrode. The second line electrode is disposed in a mesh pattern on the substrate, and is disconnected in an intersection area where it intersects the first line electrode. The second segment electrodes are connected to the second line electrode. The connection electrodes connect the disconnected second line electrode in the intersection area. The first and second line electrodes may be made of metal having low electric resistance. According to an example embodiment of the present disclosure, in a touch screen panel, first and second line electrodes are made of metal having low electric resistance, so that the electric resistance of the touch electrodes can be lowered. Accordingly, RC-delay can be reduced. In addition, the first segment electrodes and the second segment electrodes, which are connected to the first line electrode and the second line electrode, respectively, facilitate increase in the capacitance between the first line electrode and the second line electrode used for sensing touch. Therefore, a touch screen panel can have improved touch sensitivity. Further, the first and second line electrodes can be bent between segment electrodes, so that the flexibility of the touch screen panel can be improved.

The first and second line electrodes may be made of metal having low electric resistance. The first and second segment electrodes may be made of transparent conductive material.

The touch screen panel may further include a color filter layer and a black matrix. The color filter layer may be disposed on the substrate and may include a plurality of color filter units with each including a red color filter, a green color filter and a blue color filter. The red, green and blue color filters may be sequentially arranged. The black matrix may be disposed in a matrix pattern on the color filter layer.

The first and second line electrodes may be superposed on the black matrix. The matrix pattern of the black matrix may be in line with boundaries between color filters and boundaries of the plurality of color filter units. The first and second line electrode may be in line with the boundaries of the color filter units.

The touch screen panel may further include a plurality of first branch electrodes and a plurality of second branch electrodes. The first branch electrodes extend from the first line electrode to be electrically connected to the first segment electrodes. The second branch electrodes extend from the second line electrode to be electrically connected to the second segment electrode.

The first and second branch electrodes may be disposed in line with the boundaries between the red, green and blue color filters.

The connection electrodes may be disposed in line with the boundaries of the plurality of color filter units.

The connection electrodes may be disposed in line with the boundaries between the red, green and blue color filters.

The touch screen panel may further include an overcoat layer. The overcoat layer may cover the first line electrode, the second line electrode, the first segment electrodes and the second segment electrodes, and include a plurality of contact holes to expose a part of the second line electrode. The connection electrodes may connect the disconnected second line electrode via the contact holes in the intersection area.

The touch screen panel may further include a polarizer. The polarizer may be disposed under the substrate.

According to another aspect of the present disclosure, there is provided a touch screen-integrated display device. The touch screen panel includes a lower substrate, an upper substrate, a first line electrode, a plurality of first segment electrodes, a second line electrode, a plurality of second segment electrodes, and a plurality of connection electrodes. The lower substrate includes a plurality of pixels, each of the pixels having a plurality of sub-pixels. The upper substrate faces the lower substrate. The first line electrode is disposed in a mesh pattern under the upper substrate. The first segment electrodes are connected to the first line electrode. The second line electrode is disposed in a mesh pattern under the upper substrate, and is disconnected in an intersection area where it intersects the first line electrode. The second segment electrodes are connected to the second line electrode. The connection electrodes connect the disconnected second line electrode. The first and second line electrodes may be made of metal having low electric resistance. The touch screen-integrated display device according to an example embodiment of the present disclosure includes the first and second line electrodes made of metal having low electric resistance, so that the electric resistance of touch electrodes can be lowered. Further, the first line electrode and the second line electrode may have more flexibility than segment electrode and segment electrode can reduce bending-stress, so that the flexibility of the touch screen-integrated display device can be improved.

The touch screen-integrated display device may further include a bank layer and a black matrix. The bank layer may be disposed on the lower substrate. The bank may have a first portion that separates the plurality of pixels from one another, and a second portion that separates the plurality of sub-pixels from one another. The black matrix may be disposed under the upper substrate in line with the first and second portions of the bank layer.

The first and second line electrodes may be in line with the first portion of the bank layer under the black matrix.

The first and second line electrodes may be also in line with the second portion of the bank layer under the black matrix.

The connection electrodes may be disposed in line with the first portion of the bank layer under the black matrix.

The connection electrodes may be also disposed in line with the second portion of the bank layer under the black matrix.

The touch screen-integrated display device may further include a color filter layer. The color filter layer may be disposed under the upper substrate and may include a plurality of color filter units with each including red, green and blue color filters. The red, green and blue color filters may be sequentially arranged.

Each of the plurality of sub-pixels may be in line with the red, green and blue color filters, respectively. Each of the plurality of pixels may be in line with the respective color filter units.

The touch screen-integrated display device may further include a polarizer disposed on the upper substrate.

Each of the upper substrate and the lower substrate may be a substrate having flexibility.

Particulars of various example embodiments of the present invention are included in the detailed description and the accompanying drawings.

According to the present disclosure, a touch screen panel includes line electrodes having low electric resistance, and, accordingly, the electric resistance of touch electrodes is lowered. As a result, RC-delay can be reduced.

According to the present disclosure, a touch screen panel includes line electrodes superposed on the black matrix, so that the line electrodes are not seen from the outside, and moiré pattern is not observed.

According to the present disclosure, a touch screen panel includes metal line electrodes having flexibility, thereby providing a display device with improved flexibility.

Moreover, according to the present disclosure, a plurality of segment electrodes is connected to a line electrode to have sufficient capacitance area and to overcome the shortcoming of line electrodes while providing improved touch sensitivity.

According to another aspect of the present disclosure, there is provided a touch screen panel, including: a substrate; a first line electrode in a mesh pattern on the substrate; a plurality of first segment electrodes disposed on the first line electrode; a second line electrode in a mesh pattern on the substrate, and disconnected in an intersection area where the second line electrode is to intersect the first line electrode; a plurality of second segment electrodes disposed on the second line electrode; and a plurality of connection electrodes that connect the disconnected second line electrode in the intersection area, wherein the first and second line electrodes reduce resistance, and the first and second segment electrodes increase effective capacitance for sensing a touch to thereby reduce an RC-delay in the touch screen panel.

According to another aspect of the present disclosure, there is provided a method of manufacturing a touch screen panel, and including: forming a first line electrode in a mesh pattern on a substrate; forming a plurality of first segment electrodes disposed on the first line electrode; forming a second line electrode in a mesh pattern on the substrate, and disconnected in an intersection area where the second line electrode intersects the first line electrode; forming a plurality of second segment electrodes connected to the second line electrode; and forming a plurality of connection electrodes that connect the disconnected second line electrode in the intersection area, wherein the first and second line electrodes reduce resistance, and the first and second segment electrodes increase effective capacitance for sensing a touch to thereby reduce an RC-delay in the touch screen panel It should be noted that effects of the present invention are not limited to those described above and other effects of the present invention will be apparent to those skilled in the art from the following descriptions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Figure 1:
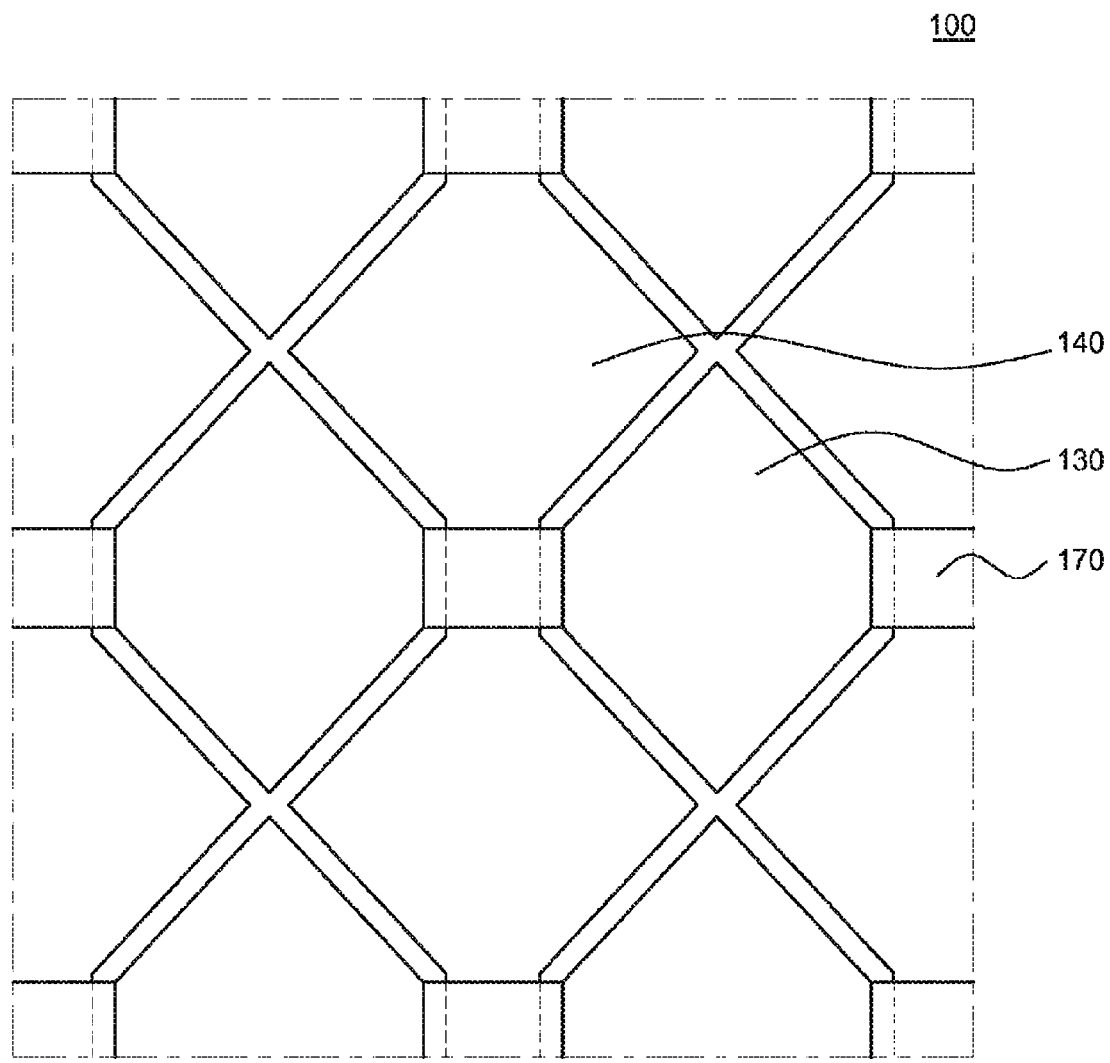
FIG. 1 is a schematic plan view for illustrating an existing touch screen panel.

Advantages and features of the present invention and methods to achieve them will become apparent from the descriptions of example embodiments herein below with reference to the accompanying drawings. However, the present invention is not limited to example embodiments disclosed herein but may be implemented in various different ways. The example embodiments are provided for making the disclosure of the present invention thorough and for fully conveying the scope of the present invention to those skilled in the art. It is to be noted that the scope of the present invention is defined only by the claims.

The figures, dimensions, ratios, angles, numbers of elements given in the drawings are merely illustrative and are not limiting. Like reference numerals denote like elements throughout the descriptions. Further, in describing the present invention, descriptions on well-known technologies may be omitted in order not to obscure the gist of the present invention. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element B" and "an element A next to an element B," another element C may be disposed between the elements A and B unless the term "directly" or "immediately" is explicitly used.

As used herein, a phrase "an element A on an element B" refers to that the element A may be disposed directly on the element B and/or the element A may be disposed indirectly on the element B via another element C.

The terms first, second, third and the like in the descriptions and in the claims are used for distinguishing between similar elements and not necessarily for describing a sequential or chronological order. These terms are used to merely distinguish one element from another. Accordingly, as used herein, a first element may be a second element within the technical idea of the present invention.

Like reference numerals denote like elements throughout the descriptions.

The drawings are not to scale and the relative dimensions of various elements in the drawings are depicted schematically and not necessarily to scale.

Features of various example embodiments of the present invention may be combined partially or totally. As will be clearly appreciated by those skilled in the art, technically various interactions and operations are possible. Various example embodiments can be practiced individually or in combination.

Hereinafter, example embodiments of the present disclosure will be described in detail with reference to the accompanying drawings.

Figure 2:
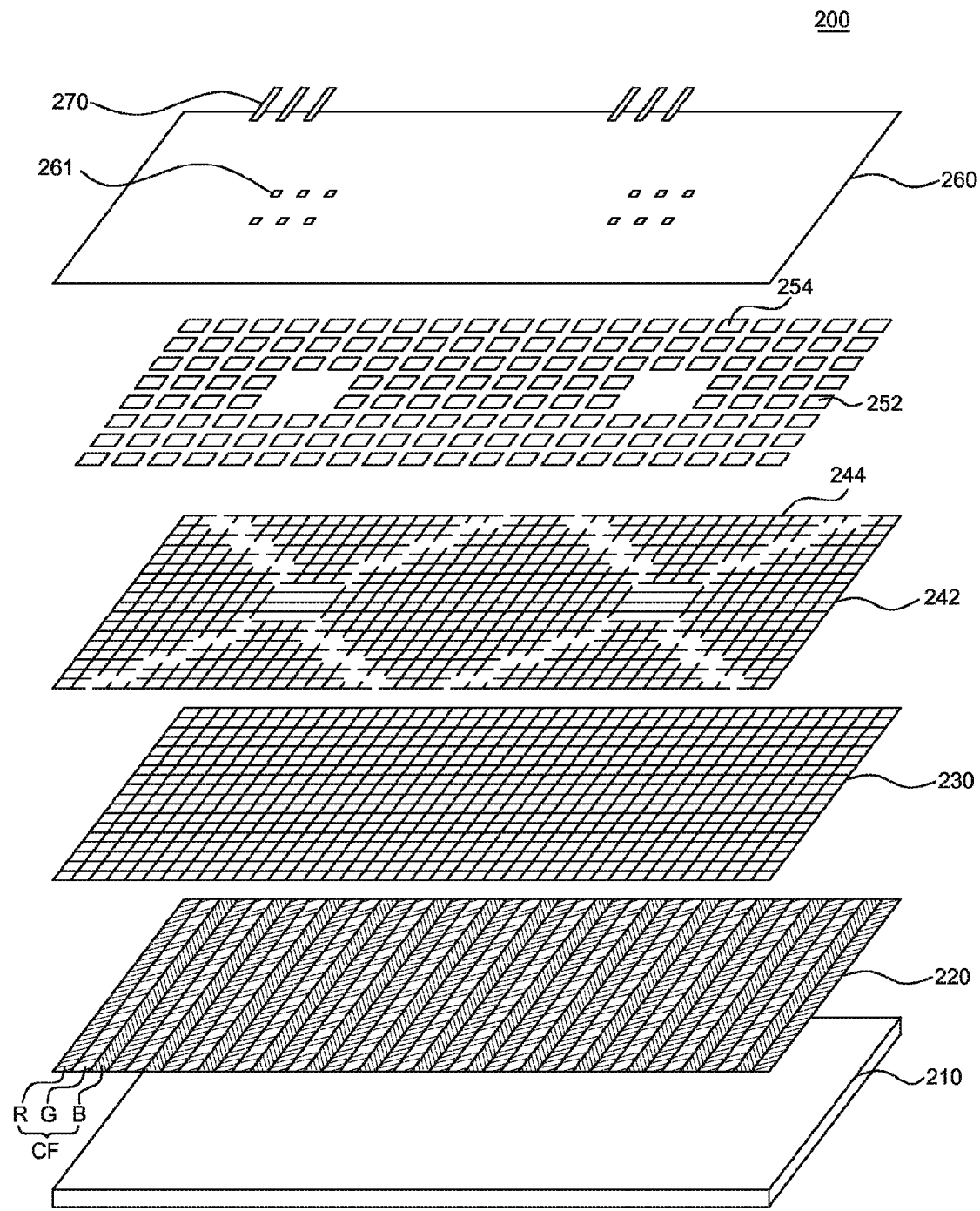
FIG. 2 is an exploded perspective view of a touch screen panel according to an example embodiment of the present disclosure.

FIG. 2 is an exploded perspective view of a touch screen panel according to an example embodiment of the present disclosure. Referring to FIG. 2, a touch screen panel 200 includes a substrate 210, a color filter layer 220, a black matrix 230, first line electrode 242, second line electrode 244, first segment electrodes 252, second segment electrode 254, an overcoat layer 260 and connection electrodes 270. In the following descriptions, the touch screen panel 200 is a capacitive touch screen panel. In FIG. 2, for convenience of illustration, thicknesses and widths of the black matrix 230, the first line electrode 242, the second line electrode 244, the color filter 220, the first segment electrodes 252 and the second segment electrode 254 are simplified.

Referring to FIG. 2, the first line electrode 242 is formed of a plurality metal lines which is deposed on the black matrix 230 and the metal lines arranged to intersect each other, so the first line electrode 242 have a plurality mesh sections. The second line electrode 244 is formed of a plurality metal lines which is deposed on the black matrix 230 and the metal lines arranged to intersect each other, so the second line electrode 244 have a plurality mesh section. The first segment electrodes 252 and the second segment electrodes 254 are disposed on the first line electrode 242 and the second line electrode 244. The overcoat layer 260 covers the first line electrode 242, the second line electrode 244, the first segment electrodes 252 and the second segment electrodes 254. The overcoat layer 260 includes a plurality of contact holes 261. The connection electrodes 270 are disposed between the contact holes 261 on the overcoat layer 260. In an example embodiment of the present disclosure, the first segment electrodes 252 and the second segment electrodes 254 respectively contact the first line electrode 242 and the second line electrode 244. In another embodiment of the present disclosure, the first line electrode 242 and the second line electrode 244 are coplanar. Also, the first segment electrodes 252 and the second segment electrodes 254 are coplanar. Additionally, first and second line electrodes 242, 252 are on a different layer from the first and second segment electrodes 252, 254.

The substrate 210, the color filter layer 220, the black matrix 230, the first line electrode 242, the second line electrode 244, the first segment electrodes 252, the second segment electrode 254, the overcoat layer 260 and the connection electrodes 270 will be described in more detail with reference to FIGS. 3 to 5B.

Figure 3:
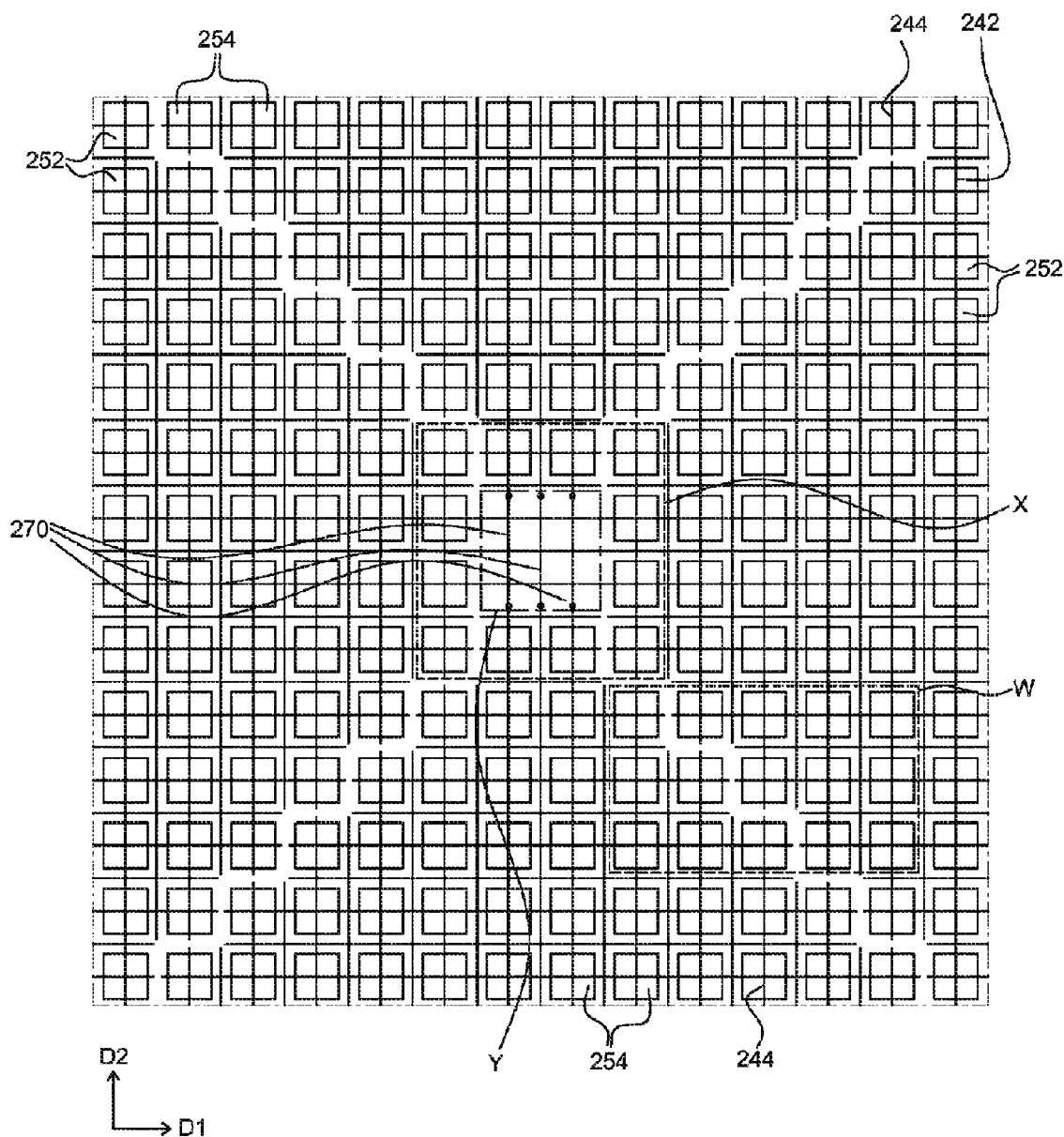
FIG. 3 is a schematic plan view of a touch screen panel according to an example embodiment of the present disclosure.

FIG. 3 is a schematic plan view of a touch screen panel according to an example embodiment of the present disclosure. For convenience of illustration, among others, the first line electrode 242, the second line electrode 244, the first segment electrodes 252, the second segment electrode 254 and the connection electrodes 270 are shown in FIG. 3. Referring to FIG. 3, the first line electrode 242, the second line electrode 244, the first segment electrodes 252, the second segment electrode 254 and the connection electrodes 270 will be described in detail.

The first line electrode 242 is formed of a plurality metal lines and the each metal lines arranged to intersect each other, so the first line electrode 242 may have a plurality mesh sections. The shape of the mesh section of the first line electrode 242 may have a particular shape. For example, the outline of the first line electrode 242 may have a diamond shape. In FIG. 3, although partially described, a part of the first line electrode 242 in a diamond shape is shown.

The first line electrode 242 may be made of a metal having low electric resistance. For example, the first line electrode 242 may be made of a metal material having low electric resistance such as aluminum (Al), copper (Cu), magnesium (Mg) and silver (Ag). As described above, existing touch screen panels include transparent touch electrodes made of transparent conductive material that has relatively high electric resistance and thus high RC-delay than other electrodes made of metal. RC-delay causes touch sensing signals to be delayed, so that the response time of the touch screen panel becomes longer, and touch sensitivity becomes poorer. In contrast, the first line electrode 242 according to an example embodiment of the present disclosure has significantly low electric resistance than that of the existing transparent touch electrodes, so that RC-delay can be reduced effectively. Accordingly, the response time of the touch screen panel 200 can be improved. In addition, since metal has high flexibility, the first line electrode 242 disposed in the mesh pattern can become more flexible than existing transparent touch electrodes.

The second line electrode 244 is formed of a plurality metal lines and the each metal lines cross intersect other, so the second line electrode 244 may have a plurality mesh sections. The shape of the mesh section of the second electrode 244 may have a diamond shape. In FIG. 3, although partially described, a part of the second line electrode 244 in a diamond shape is shown.

The second line electrode 244 may be made of a metal having low electric resistance. For example, the second line electrode 244 may be made of the same material as the first line electrode 242. The second line electrode 244 has low electric resistance, so that RC-delay can be reduced effectively. Accordingly, the response time of the touch screen panel 200 can be improved. In addition, since metal has high flexibility, the second line electrode 244 disposed in the mesh pattern can become more flexible than existing transparent touch electrodes.

The first line electrode 242, which extends in the first direction D1, intersects the second line electrode 244, which extends in the second direction D2. The first line electrode 242 is electrically separated from the second line electrode 244. In this regard, the second line electrode 244 is disconnected at an intersection area X, and the first line electrode 242 is routed across the disconnected section of the second line electrodes 244.

The first line electrode 242 includes a plurality of metal mesh sections. Each metal mesh section is formed of a plurality of metal lines arranged to intersect each other. Metal lines creating the metal mesh sections of the first line electrode 242 may be provided in several lengths and arranged in relation with one another to shape the metal mesh sections. For instance, shorter metal lines may be positioned further away from the center of the respective metal mesh section so that the metal mesh section is provided in a diamond-shape as depicted in FIG. 3. It should be noted that the lengths and the arrangement of the metal lines can vary, and thus the metal mesh sections of the first line electrode 242 can be provided in various other shapes. In order to connect the plurality of the metal mesh sections of the first line electrode 242, at least some of the metal lines of the metal mesh sections may be arranged to extend across multiple metal mesh sections.

Each of the plurality of first segment electrodes 242 is electrically connected to the first line electrode 242. As shown in FIG. 3, each of the first segment electrodes 252 is superposed on the respective cross points of the first line electrode 242. The first segment electrodes 252 may be arranged in substantially regular spaces.

The first segment electrodes 252 may be made of a transparent conductive material. For example, the first segment electrodes 252 may be made of a transparent conductive material, such as ITO (indium tin oxide) and IZO (indium zinc oxide). Since the first segment electrodes 252 are transparent, the touch screen panel 200 employing the first segment electrodes 252 does not impair visibility of the display device.

Each of the first segment electrodes 252 is a plane electrode. Each of the plurality of first segment electrodes 242 is connected to the first line electrode 242 to work as a first touch electrode. Since the first line electrode 242 is a pattern of thin metal lines, it has a small electrode area for holding sufficient capacitance. Therefore, when only the first line electrode 242 is used as touch electrodes, effective capacitance necessary for sensing touch is so small, and thus touch sensitivity of a touch screen panel may be deteriorated. In this regard, the first segment electrodes 252 may have the electrode area more than the first electrode 242 so that they may increase effective capacitance for sensing touch. Accordingly, the touch sensitivity of the touch screen panel 200 can be improved. On the other hand, the first line electrode 242 connecting the first segment electrodes 252 to one another can be bent between the first segment electrodes 252. Therefore, the first line electrode 242 and the first segment electrodes 252 are flexible as a whole. Accordingly, the touch screen panel 200 can be provided with flexibility.

Each of the plurality of second segment electrodes 254 is electrically connected to the second line electrode 244. Each of the second segment electrodes 254 is superposed on the respective cross points of the second line electrode 244. The second segment electrodes 254 may be disposed in substantially regular spaces. The second segment electrodes 254 may be made of a transparent conductive material. For example, the second segment electrodes 254 may be made of the same material as the first segment electrodes 252. By doing so, the touch screen panel 200 employing the second segment electrodes 254 does not impair visibility of the display device.

Each of the plurality of second segment electrodes 254 is a plane electrode and connected to the second line electrode 242 to work as a second touch electrode. The second segment electrodes 254 increase the electrode area for capacitance, so that the effective capacitance of the second touch electrodes can be increased sufficiently. Accordingly, the touch sensitivity of the touch screen panel 200 can be improved. On the other hand, the second line electrode 254 connecting the second segment electrodes 254 to one another can be bent between the second segment electrodes 254. Therefore, the second line electrode 244 and the second segment electrodes 254 are flexible as a whole. Accordingly, the touch screen panel 200 can be provided with flexibility.

In the intersection area Y, the first line electrode 242 and the second line electrode 244 is cross with each other as shown, and the second line electrode 244 have a disconnect portion over the first line electrode 242. Thus, in order to electronically connect the second line electrode 244, the connection electrodes 270 connect the line electrode 244. The second line electrode 244 is electronically connected to a D2 direction via the connection electrodes 270 to work as a touch electrode. The connection electrodes 270 may be made of a metal having low electric resistance. For example, the connection electrodes 270 may be made of a metal having low electric resistance such as aluminum (Al), copper (Cu), magnesium (Mg) and silver (Ag). Accordingly, the electric resistance of the second touch electrodes is significantly reduced, and the RC-delay can be reduced. In addition, since metal has high flexibility, the second touch electrodes can have high flexibility.

Hereinafter, a layered structure of a variety of elements of the touch screen panel 200 will be described with reference to FIGS. 4A to 5B.

Figure 4A:
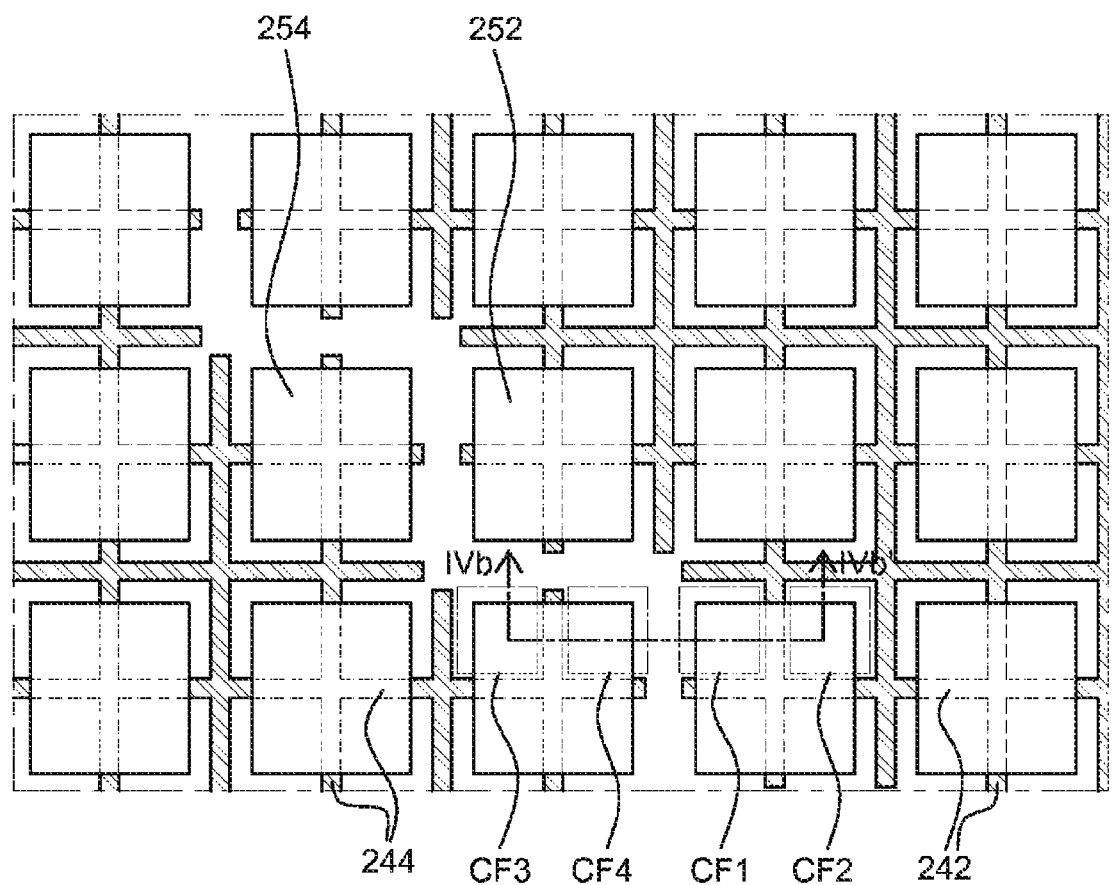
FIG. 4A is an enlarged plan view of an area W shown in FIG. 3.
Figure 4B:
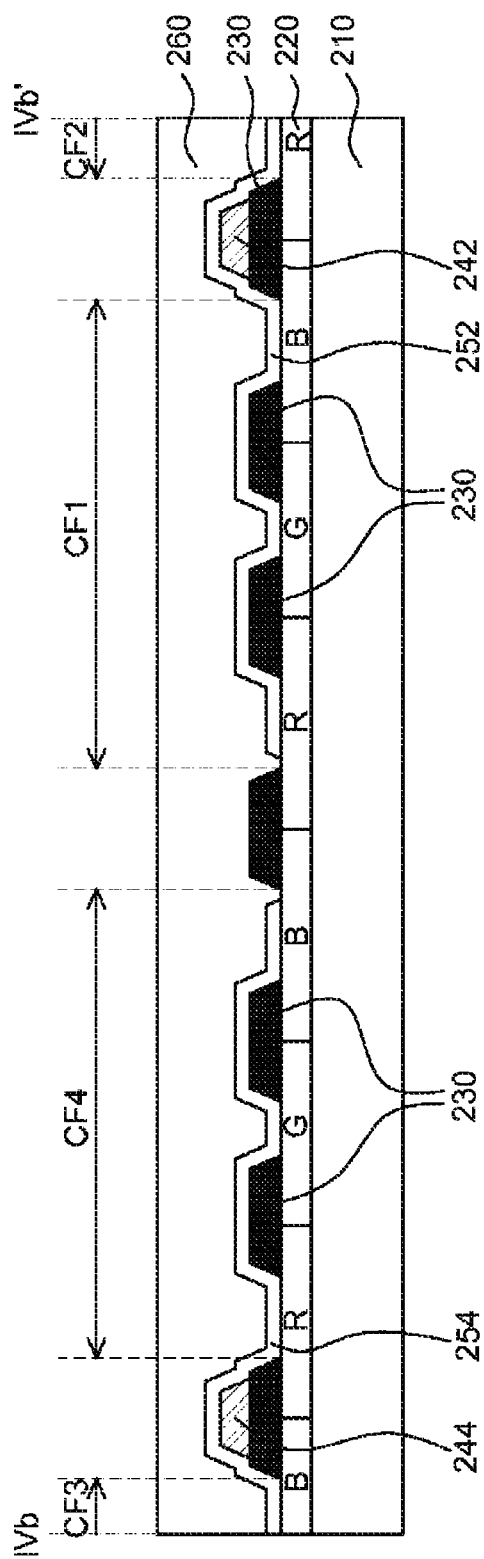
FIG. 4B is a cross-sectional view taken along line IVb-IVb' of FIG. 4A.

FIG. 4A is an enlarged plan view of an area W shown in FIG. 3. FIG. 4B is a cross-sectional view taken along line IVb-IVb' of FIG. 4A.

Referring to FIGS. 4A and 4B, the substrate 210 supports thereon elements of the touch screen panel 200. The substrate 210 may be made of transparent, insulative material, such as a transparent plastic material having flexibility.

The color filter layer 220 includes a plurality of color filter units CF1, CF2, CF3 and CF4. Each of the plurality of color filter units CF1, CF2, CF3 and CF4 includes a red color filter (R), a green color filter (G) and a blue color filter (B). The red color filter (R), the green color filter (G) and the blue color filter (B) are sequentially disposed. In other words, the red color filter (R), the green color filter (G) and the blue color filter (B) are periodically repeated.

The black matrix 230 prevents colors from mixing with one another in a display device employing the touch screen panel 200. Further, it prevents the external light from being reflected from the first line electrode 242 and the second line electrode 244. The black matrix 230 is disposed on the color filter layer 220 in a matrix pattern. For example, the black matrix is disposed in line with boundaries between the red color filter (R), the green color filter (G) and the blue color filter (B), and boundaries between the color filter units (CFs). The black matrix 230 may have flexibility.

The overcoat layer 260 is an insulation layer that planarizes upper sides of the first line electrode 242 and the second line electrode 244. The overcoat layer 260 may be made of a transparent, insulative material so as not to impair the visibility of the display device.

The first line electrode 242 and the second line electrode 244 are disposed in line with the boundaries between the color filter units CF1, CF2, CF3 and CF4 in the color filter layer 220. As shown in the example of FIG. 4A, a plurality metal lines of the first line electrode 242 is disposed in line with the boundary between the first color filter unit CF1 and the second color filter unit CF2. In addition, a plurality metal lines of the second line electrode 244 is disposed in line with the boundary between the third color filter unit CF3 and the fourth color filter unit CF4.

As shown in FIG. 4B, the metal lines of the first line electrode 242 and the second line electrode 244 are superposed on the black matrix 230. For example, the metal lines of the first line electrode 242 and the second line electrode 244 are disposed on the black matrix 230. Although the first line electrode 242 and the second line electrode 244 are shown as being formed on the black matrix 230 in FIG. 4B, the surface that a user touches is actually the lower surface of the substrate 210. Accordingly, from the user's point of view, all the metal lines of the first line electrode 242 and the second line electrode 244 are hidden by the black matrix 230. Generally, metals have high reflectivity and thus metal mesh patterns can be seen from the outside. However, the first line electrode 242 and the second line electrode 244 are superposed on the black matrix 230, so that they cannot be seen from the outside. As a result, moiré patterns made by the first line electrode 242 and the second line electrode 244 are not observed.

The first segment electrodes 252 are electrically connected to the first line electrode 242. For example, the lower surface of each of the first segment electrodes 252 is directly connected to the upper surface of the first line electrode 242. The first segment electrodes 252 cover the color filter units CF1 and CF2. For example, the first segment electrodes 252 cover the first color filter units CF1 and the second color filter units CF2. As described above, the first segment electrodes 252 are made of a transparent conductive material, so that they can transmit light passed through the color filter units CF1 and CF2.

The second segment electrodes 254 are electrically connected to the second line electrode 244. For example, the lower surface of each of the second segment electrodes 254 is directly connected to the upper surface of the second line electrode 244. The second segment electrodes 254 cover the color filter units CF3 and CF4. The second segment electrodes 254 are made of a transparent conductive material, so that they can transmit light passed through the color filter units CF3 and CF4.

Figure 5A:
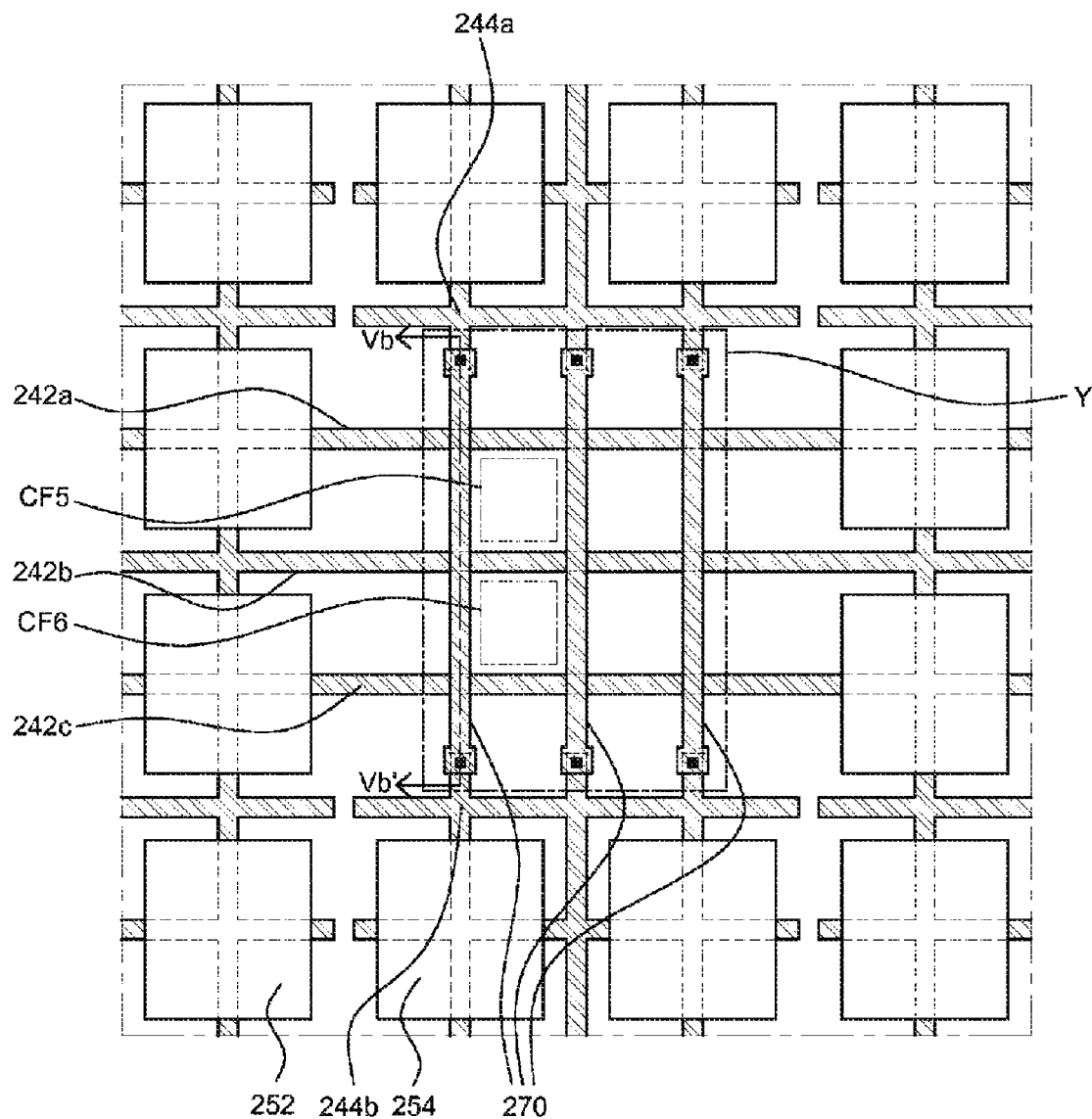
FIG. 5A is an enlarged plan view of an area X shown in FIG. 3.
Figure 5B:
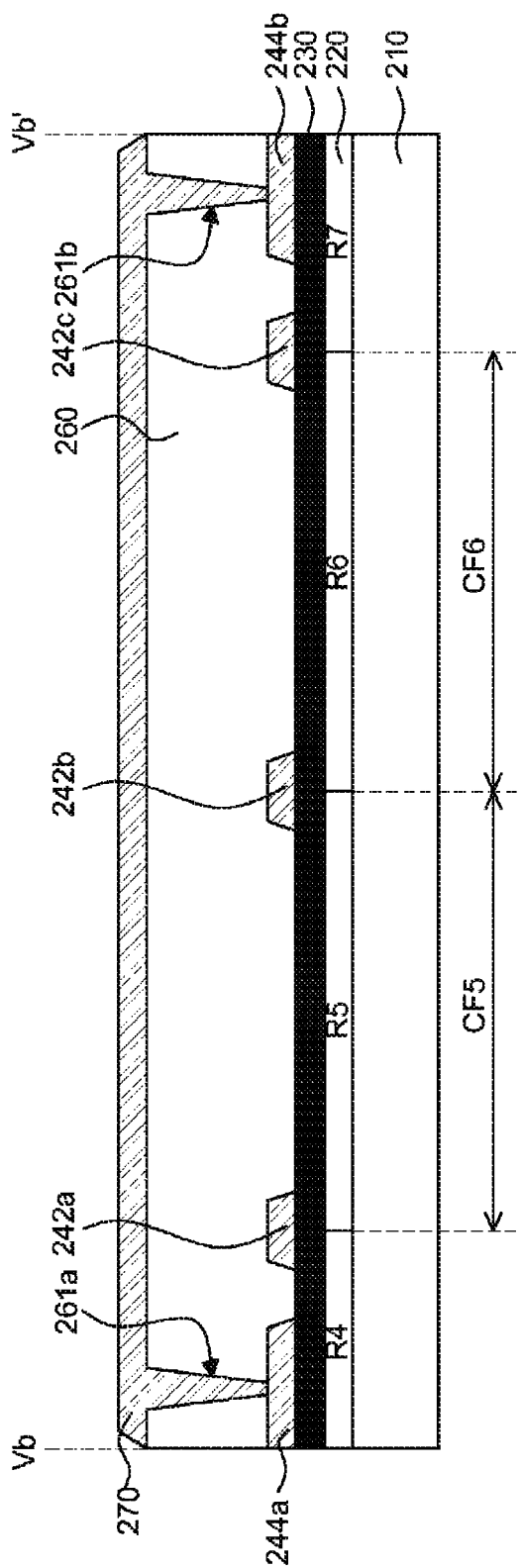
FIG. 5B is a cross-sectional view taken along line Vb-Vb' of FIG. 5A.

FIG. 5A is an enlarged plan view of an area X shown in FIG. 3. FIG. 5B is a cross-sectional view taken along line Vb-Vb' of FIG. 5A. In FIGS. 5A and 5B, the substrate 210, the color filter layer 220, the black matrix 230, the first line electrode 242, the second line electrodes 244a and 244b, the first segment electrodes 252, and the second segment electrode 254 are already described above and, therefore, they will not be described again.

Referring to FIGS. 5A and 5B, the overcoat layer 260 covers the first line electrodes 242a, 242b and 242c, the second line electrodes 244a and 244b, the first segment electrodes 252 and the second segment electrodes 254. The overcoat layer 260 includes a plurality of contact holes 261*a* and 261*b*. As shown in FIG. 5B, the contact holes 261*a* and 261*b* are disposed on the metal line of the second line electrode 244*a* and the metal line of the second line electrode 244*b* where the first line electrode 242 intersects the metal lines of the second line electrodes 244*a* and 244*b*. In the intersection area Y, a part of each of the separated metal lines of second line electrodes 244*a* and 244*b* is exposed. For example, the first contact hole 261*a* exposes a part of the metal line of the second line electrode 244*a*, and the second contact hole 261*b* exposes a part of the metal line of the second line electrode 244*b*.

In the intersection area Y, the connection electrodes 270 connect the separated metal lines of the second line electrodes 244*a* and 244*b* to each other. For example, as shown in FIG. 5A, the connection electrodes 279 come in contact with the metal line of the second line electrode 244*a* via the first contact hole 261*a*, and come in contact with the metal line of the second line electrode 244*b* via the second contact hole 261*b*. The lines of the first line electrodes 242*a*, 242*b* and 242*c* are extended under the connection electrodes 270. In this manner, the metal lines of first line electrodes 242*a*, 242*b* and 242*c* can be continuously deposed in the intersection area Y.

The connection electrodes 270 are disposed such that they correspond to boundaries of the color filter units CF5 and CF6. For example, the connection electrodes 270 are disposed such that they pass above the boundary of the fifth color filter unit CF5 and the boundary of the sixth color filter unit CF6.

As shown in FIG. 5B, the connection electrodes 270 are disposed above the black matrix 230. Accordingly, from a user's point of view, the connection electrodes 270 are hidden by the black matrix 230. In other words, the connection electrodes 270 cannot be seen from the outside, and thus moiré pattern made by the connection electrodes 270 is not observed.

In some example embodiment, the touch screen panel 200 may include a polarizer without black matrix 230. The polarizer may be disposed under the substrate 210. The polarizer can reduce reflection of external light induced by the first line electrode 242 and the second line electrode 244.

As described above, the touch screen panel 200 according to an example embodiment of the present disclosure includes the first line electrode 242, the second line electrode 244, the plurality of the first segment electrodes 252 and the plurality of second segment electrodes 254. The first line electrode 242 and the second line electrode 244 are made of a metal having low electric resistance, so that the electric resistance of the first and second touch electrodes can be lowered. As a result, the RC-delay of the touch screen panel 200 can be significantly reduced. In addition, the first segment electrodes 252 are connected to the first line electrode 242 to have area for holding sufficient capacitance for sensing touch. Likewise, the second segment electrodes 254 are connected to the second line electrode 244. As a result, the effective capacitance for sensing touch can be increased. Accordingly, the touch screen panel 200 can still have good touch sensitivity. Further, the first line electrode 242, the second line electrode 244 and the connection electrodes 270 are superposed on the black matrix 230, so that moiré patterns made by the mesh patterns are not observed. Furthermore, as the first line electrode 242, the second line electrode 244 and the connection electrodes 270 are made of metals having high flexibility, the first and second touch electrodes can have high flexibility.

Figure 6:
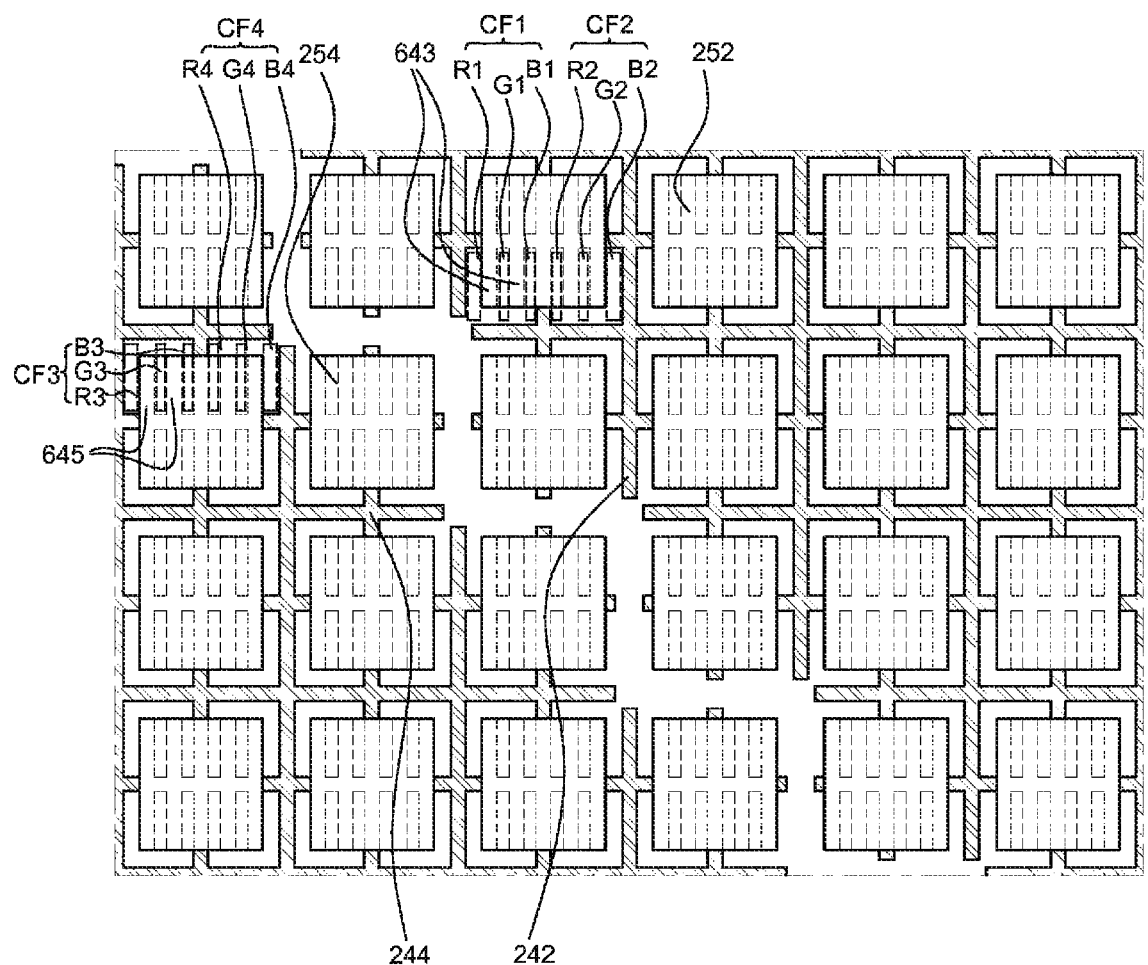
FIG. 6 is a schematic plan view of a touch screen panel according to another example embodiment of the present disclosure.
Figure 7:
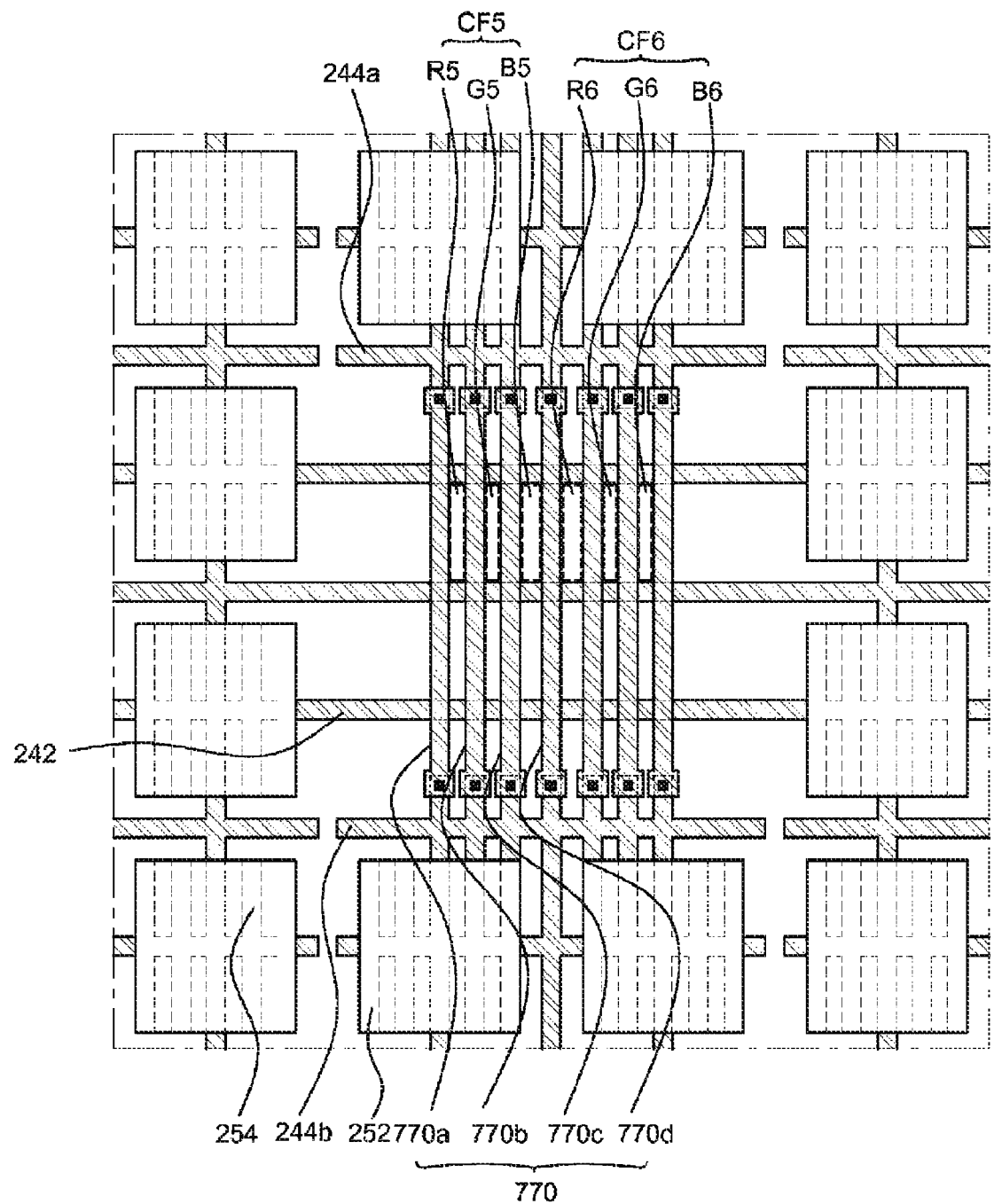
FIG. 7 is a schematic plan view of a touch screen panel according to another example embodiment of the present disclosure.

FIG. 6 is a schematic plan view of a touch screen panel according to another example embodiment of the present disclosure for illustrating first and second branch electrodes. FIG. 7 is a schematic plan view of a touch screen panel according to another example embodiment of the present disclosure for illustrating connection electrodes. The touch screen panel shown in FIGS. 6 and 7 are substantially identical to the touch screen panel 200 shown in FIG. 2, except that the former further includes first branch electrodes 643 and second branch electrodes 645, and the connection electrodes 770 are disposed at different locations and, therefore, the redundant description will be omitted.

The first branch electrodes 643 are extended from the metal line of the first line electrode 242 to be electrically connected to the first segment electrode 252. For example, the upper surface of each of the first branch electrodes 643 is in contact with the lower surface of a respective first segment electrode 252. As shown in FIG. 6, the first branch electrodes 643 are disposed in line with boundaries between every two different color filters, i.e., between the red color filters R1 and R2, the green color filters G1 and G2, and the blue color filters B1 and B2 in the color filter layer 220, respectively. For example, the first branch electrodes 643 are disposed at the boundary between the first red color filter R1 and the first green color filter G1, at the boundary between the first green color filter G1 and the first blue color filter B1, at the boundary between the second red color filter R2 and the second green color filter G2, and at the boundary between the second green color filter G2 and the second blue color filter B2, respectively. Further, the first branch electrodes 643 are disposed at boundaries of the color filter units CF1 and CF2. For example, the first branch electrodes 643 are disposed at the boundaries of the first color filter unit CF1 and the second color filter unit CF2.

The second branch electrodes 645 are extended from the metal line of the second line electrode 244 to be electrically connected to the second segment electrode 254. For example, the upper surface of each of the second branch electrodes 645 is in contact with the lower surface of a respective second segment electrode 254. The second branch electrodes 645 are disposed in line with boundaries between every two different color filters, i.e., between the red color filters R3 and R4, the green color filters G3 and G4, and the blue color filters B3 and B4 in the color filter layer 220, respectively. Further, the second branch electrodes 645 are disposed at boundaries of the color filter units CF3 and CF4.

The first branch electrodes 643 and the second branch electrodes may be made of metals having low electric resistance. For example, the first branch electrodes 643 and the second branch electrodes 645 may be made of the same material as that of the first line electrode 242 and the second line electrode 244, respectively. Accordingly, the electric resistance of the first and second touch electrodes can be further reduced. As described above, as the first line electrode 242 and the second line electrode 244 have low electric resistance, the RC-delay in the first and second touch electrodes can be lowered. However, in case of manufacturing an extremely thin touch screen panel, the first and second touch electrodes are very densely disposed, so that capacitance may be increased. In addition, in case a touch screen panel is integrated within a display device, parasitic capacitance may occur between the cathode (or the common electrode) and the first and second touch electrodes of the display device. As a result, the RC-delay may increase again. Since the first branch electrodes 643 and the second branch electrodes 645 are extended from the first line electrode 242 and the second line electrode 244, respectively, the overall area of the first and second touch electrodes can be increased. In general, as electric resistance is inversely proportional to effective electronic path, the first branch electrodes 643 and the second branch electrodes 645 reduce the overall electric resistance of the first and second touch electrodes.

As shown in FIG. 7, the connection electrodes 770 connect the separated metal lines of the second line electrodes 244*a* and 244*b*. The connection electrodes 770 are disposed in line with the boundaries of the color filter units CFs in the color filter layer 220. For example, a first connection electrode 770*a* passes above the boundary of the fifth color filter unit CF5 and a fourth connection electrode 770*d* passes above the boundary of the sixth color filter unit CF6. Further, the connection electrodes 770 are disposed in line with the boundaries between every two different color filters, i.e., between the red color filters R5 and R6, the green color filters G5 and G6, and the blue color filters B5 and B6, respectively. For example, a second connection electrode 770*b* is disposed in line with the boundary between a fifth red color filter R5 and a fifth green color filter G5. A third connection electrode 770*c* is disposed in line with the boundary between a fifth green color filter G5 and a fifth blue color filter B5.

As described above, the touch screen panel according to this example embodiment of the present disclosure includes the first branch electrodes 643 extended from the first line electrode 242 and the second branch electrodes 645 extended from the second line electrode 244. Namely, the effective electronic planes of the first and second touch electrodes are increased, so that the overall electric resistance of the first and second touch electrodes can be lowered. Further, the connection electrodes 770 are also disposed in line with the boundaries between every two different color filters, i.e., the red color filters R5 and R6, the green color filters G5 and G6, and the blue color filters B5 and B6, respectively, in the color filter layer 220, as well as the boundaries of the color filter units CF5 and CF6 in the color filter layer 220. As the connection electrodes 700 are more densely arranged, the effective electronic plane of the connection electrodes 770 can be increased. As a result, the overall electric resistance of the touch screen panel can be further reduced, and the RC-delay of the touch screen panel can be significantly lowered. Accordingly, the touch screen panel can become thinner. Further, the first branch electrodes 643, the second branch electrodes 645 and the connection electrodes 770 are superposed on the black matrix 230. Accordingly, moiré patterns made by the first branch electrodes 643, the second branch electrodes 645 and the connection electrodes 770 are not observed. Furthermore, as the first branch electrodes 643, the second branch electrodes 645 and the connection electrodes 770 are made of a metal having high flexibility, the touch screen panel can have improved flexibility.

Figure 8:
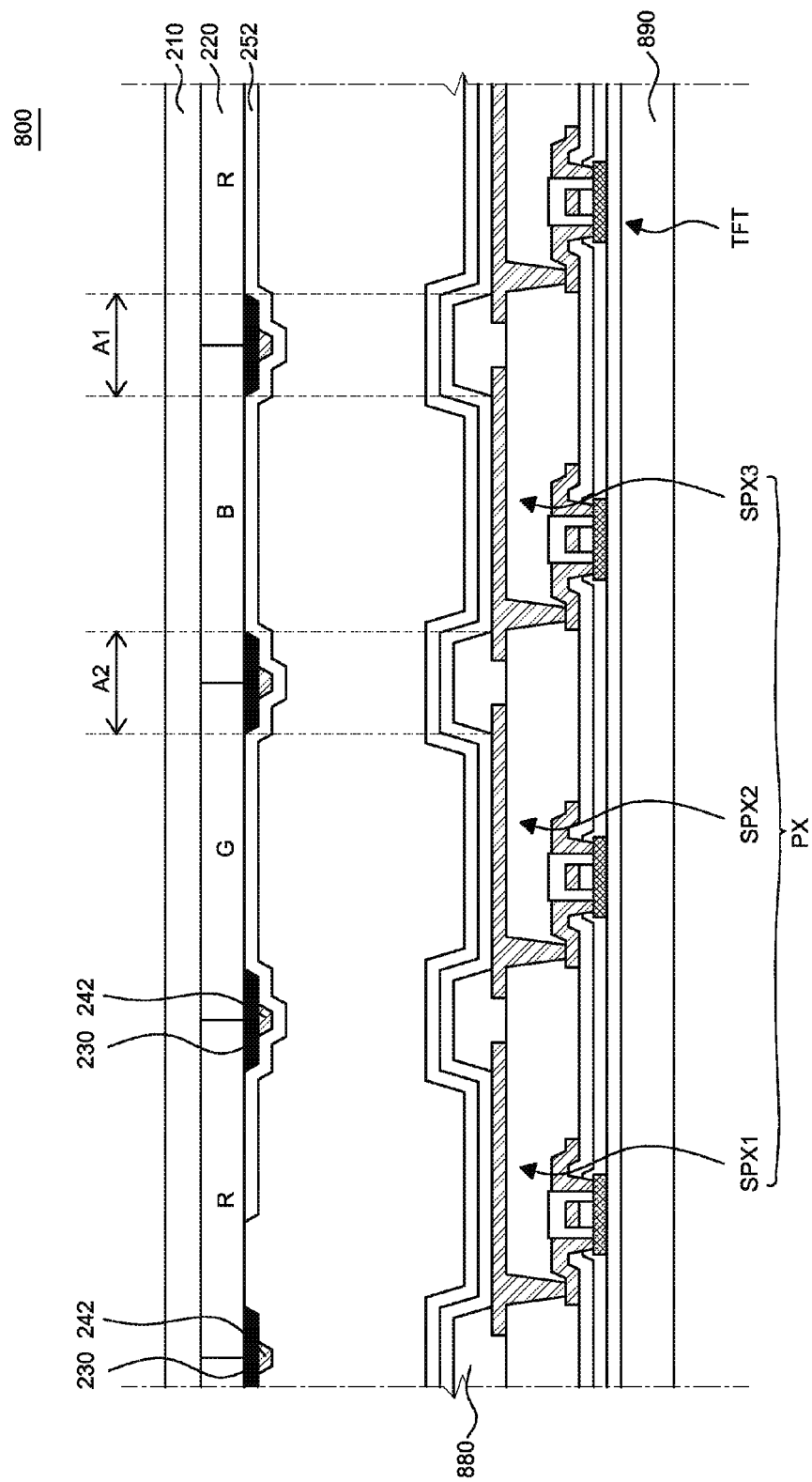
FIG. 8 is a cross-sectional view of a touch screen-integrated display device according to an example embodiment of the present disclosure.

FIG. 8 is a cross-sectional view of a touch screen-integrated display device according to an example embodiment of the present disclosure. Referring to FIG. 8, a touch screen-integrated display device 800 includes a lower substrate 890, a bank layer 880, an upper substrate 210, a color filter layer 220, a black matrix 230, first line electrode 242, second line electrode 244, first segment electrodes 252, second segment electrode 254, and connection electrodes 270. FIG. 8 illustrates the first line electrode 242 and the first segment electrodes 252 only for convenience of illustration. The second line electrode, the second segment electrodes and the connection electrodes are substantially identical to the second line electrode 244, the second segment electrodes 254 and the connection electrodes 270 described above with respect to FIGS. 1 to 7. In addition, the color filter layer 220, the black matrix 230, the first line electrode 242 and the first segment electrodes 252 of the touch screen-integrated display device 800 are substantially identical to the color filter layer 220, the black matrix 230, the first line electrode 242 and the first segment electrodes 252 described above with respect to FIGS. 1 to 7 and, therefore, the redundant description will be omitted.

The lower substrate 890 supports thereon a variety of elements of the touch screen-integrated display device 800. The lower substrate 890 is made of an insulative material. For example, the lower substrate 890 may be made of an insulation material having flexibility.

The lower substrate 890 includes a plurality of pixels PXs. Each of the plurality of pixels PXs includes a plurality of sub-pixels SPX1, SPX2 and SPX3. Each of the plurality of the sub-pixels SPX1, SPX2 and SPX3 includes at least one display element. For example, each of the plurality of the sub-pixels SPX1, SPX2 and SPX3 includes an organic light-emitting element as the display element. Further, each of the plurality of the sub-pixels SPX1, SPX2 and SPX3 includes a liquid crystal display element. For convenience of illustration, the lower substrate 890 includes organic light-emitting elements in FIG. 8. On the lower substrate 890, thin-film transistors TFT for controlling the sub-pixels SPX1, SPX2 and SPX3 are disposed. The thin-film transistors TFT are connected to the sub-pixels SPX1, SPX2 and SPX3 to turn on and off the sub-pixels SPX1, SPX2 and SPX3.

The bank layer 880 is disposed on the lower substrate 890 and has first portions A1 to separate the pixels PXs from one another and second portions A2 to separate the sub-pixels SPX1, SPX2 and SPX3 from one another. The first portions A1 correspond to the boundaries between the pixels PXs, and the second portions A2 correspond to the boundaries between the sub-pixels SPX1, SPX2 and SPX3. The bank layer 880 may be disposed in a matrix pattern so as to expose the sub-pixels SPX1, SPX2 and SPX3. The bank layer 880 may have flexibility.

The black matrix 230 is disposed above the bank layer 880 to conform thereto. For example, the black matrix 230 is superposed on the first portions A1 and the second portions A2 of the bank layer 880. In other words, the black matrix 230 is disposed in a mesh pattern and is superposed on the mesh pattern of the bank layer 880. Accordingly, the black matrix 230 exposes the sub-pixels SPX1, SPX2 and SPX3.

The first line electrode 242 and the second line electrode are disposed under the black matrix 230, and are in line with the first portions A1 of the bank layer 880. The first portions A1 correspond to the boundaries between the pixels PXs. Namely, the first line electrode 242 and the second line electrode do not intrude into the area of pixels PXs. Accordingly, the pixels PXs can be exposed in their entirety, and the visibility of the touch screen-integrated display device 800 can be improved. In addition, the first line electrode 242 and the second line electrode are disposed under the black matrix 230 and thus are not seen from the outside. Accordingly, moiré pattern is not observed.

In an example embodiment, the first line electrode 242 and the second line electrode are also in line with the second portions A2 of the bank layer 880 under the black matrix 230. The second portions A2 correspond to the boundaries between the sub-pixels SPX1, SPX2 and SPX3. Namely, the first line electrode 242 and the second line electrode are more densely disposed. In this example embodiment, the overall areas of the first and second touch electrodes are increased, so that the overall electric resistance of the first and second touch electrodes can be lowered. As a result, the RC-delay of the touch screen panel is significantly reduced. In addition, since the first line electrode 242 and the second line electrode are in line with the second portions A2 of the bank layer 880, they do not violate area of the pixels PXs and the sub-pixels SPX1, SPX2 and SPX3. Accordingly, the visibility of the touch screen-integrated display device 800 can be improved.

The connection electrodes are disposed under the black matrix 230, and are in line with the first portions A1 of the bank layer 880. Namely, the connection electrodes are disposed in line with the boundaries between the pixels PXs. In an example embodiment, the connection electrodes are also in line with the second portions A2 of the bank layer 880 under the black matrix 230. Namely, the connection electrodes 270 are disposed in line with the boundaries between the sub-pixels SPX1, SPX2 and SPX3. The connection electrodes are disposed under the black matrix 230 and thus are not seen from the outside. In addition, the connection electrodes are disposed in line with the boundaries between the pixels PXs and the boundaries between the sub-pixels SPX1, SPX2 and SPX3, so that they do not violate the area of the pixels PXs and the sub-pixels SPX1, SPX2 and SPX3. Accordingly, the visibility of the touch screen-integrated display device 800 is not impaired.

The color filter layer 220 is disposed beneath the upper substrate 210 and includes a plurality of color filter units with each including a red color filter (R), a green color filter (G) and a blue color filter (B). The red color filter (R), the green color filter (G) and the blue color filter (B) are in line with the sub-pixels SPX1, SPX2 and SPX3, respectively. For example, the red color filter R is in line with the first sub-pixel SPX1, the green color filter G is in line with the second sub-pixel SPX2, and the blue color filter B is in line with the third sub-pixel SPX3. Each of the sub-pixels SPX1, SPX2 and SPX3 can represent a particular color through the color filters R, G and B.

The upper substrate 210 covers the lower substrate 890 and protects the sub-pixels SPX1, SPX2 and SPX3 and the thin-film transistors. In an example embodiment, the upper substrate 210 may have flexibility. For example, the upper substrate 210 may be a transparent plastic substrate having flexibility.

As described above, the touch screen-integrated display device 800 includes the first line electrode 242 and the second line electrode having low electric resistance, and the transparent, first segment electrodes 252 and second segment electrodes, so that the electric resistance of the first and second touch electrodes can be significantly reduced thereby improving touch sensitivity. In particular, the first line electrode 242 and the second line electrode are in line with the first portions A1 and the second areas A2 of the bank layer 880 under the black matrix 230, so that they are neither seen from the outside nor violate the area of the pixels PXs and the sub-pixels SPX1, SPX2 and SPX3. Accordingly, moiré pattern is not observed, and the visibility of the touch screen-integrated display device 800 can be improved. Further, the first line electrode 242, the second line electrode and the connection electrodes are so densely disposed that they are in line with the boundaries between the sub-pixels SPX1, SPX2 and SPX3, so that the RC-delay can be reduced sufficiently. As a result, the touch screen-integrated display device 800 can be made thinner with high flexibility.

In some example embodiment, the touch screen-integrated display device 800 may include a polarizer without black matrix 230. The polarizer may be disposed on the upper substrate 210. The polarizer can reduce reflection of external light induced by the first line electrode 242 and the second line electrode 244.

Thus far, example embodiments of the present disclosure have been described in detail with reference to the accompanying drawings. However, the present disclosure is not limited to the example embodiments, and modifications and variations can be made thereto without departing from the technical idea of the present disclosure. Accordingly, the example embodiments described herein are merely illustrative and are not intended to limit the scope of the present invention. The technical idea of the present invention is not limited by the example embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A touch screen panel, comprising
a substrate;
a first line electrode in a mesh pattern on the substrate; a plurality of first segment electrodes disposed on the first line electrode;
a second line electrode in a mesh pattern on the substrate, and disconnected in an intersection area where the second line electrode is to intersect the first line electrode;
a plurality of second segment electrodes disposed on the second line electrode;
a color filter layer and a black matrix; and
a plurality of connection electrodes that connect the disconnected second line electrode in the intersection area,
wherein the first and second line electrodes reduce resistance, and the first and second segment electrodes increase effective capacitance for sensing a touch to thereby reduce an RC-delay in the touch screen panel,
the color filter layer is disposed on the substrate and includes a plurality of color filter units each including a red color filter, a green color filter and a blue color filter that are sequentially arranged,
the black matrix is disposed in a matrix pattern on the color filter layer, and
the first and second line electrodes are superposed on the black matrix.

2. The touch screen panel of claim 1, wherein the first and second line electrodes are made of metal.

3. The touch screen panel of claim 1, wherein the first and second segment electrodes are made of a transparent conductive material.

4. The touch screen panel of claim 1, wherein the matrix pattern of the black matrix is in line with boundaries between color filters and boundaries of the plurality of color filter units.

5. The touch screen panel of claim 4, wherein the first and second line electrode are in line with the boundaries of the color filter units.

6. The touch screen panel of claim 1, further comprising a plurality of first branch electrodes and a plurality of second branch electrodes,
wherein the first branch electrodes extend from the first line electrode and are electrically connected to the first segment electrodes, and wherein the second branch electrodes extend from the second line electrode and are electrically connected to the second segment electrodes.

7. The touch screen panel of claim 1, wherein the first line electrode and the second line electrode are coplanar,
wherein the plurality of first segment electrodes and the plurality of second segment electrodes are coplanar, and
the first and second line electrodes are on a different layer from the first and second segment electrodes.

8. The touch screen panel of claim 1, wherein the touch screen panel is flexible based on the first and second line electrodes, and the first and second segment electrodes.

9. A method of manufacturing a touch screen panel, the method comprising:
forming a first line electrode in a mesh pattern on a substrate;
forming a plurality of first segment electrodes disposed on the first line electrode;
forming a second line electrode in a mesh pattern on the substrate, and disconnected in an intersection area where the second line electrode intersects the first line electrode;
forming a plurality of second segment electrodes connected to the second line electrode;
forming a plurality of connection electrodes that connect the disconnected second line electrode in the intersection area; and
forming a color filter layer and a black matrix,
wherein the first and second line electrodes reduce resistance, and the first and second segment electrodes increase effective capacitance for sensing a touch to thereby reduce an RC-delay in the touch screen panel,
the color filter layer is disposed on the substrate and includes a plurality of color filter units each including a red color filter, a green color filter and a blue color filter that are sequentially arranged,
the black matrix is disposed in a matrix pattern on the color filter layer, and
the first and second line electrodes are superposed on the black matrix.

10. The method of claim 9, wherein the first and second line electrodes are made of metal.

11. The method of claim 9, wherein the first and second segment electrodes are made of a transparent conductive material.

12. The method of claim 9, wherein the matrix pattern of the black matrix is in line with boundaries between color filters and boundaries of the plurality of color filter units.

13. The method of claim 12, wherein the first and second line electrode are in line with the boundaries of the color filter units.

14. The method of claim 9, further comprising forming a plurality of first branch electrodes and a plurality of second branch electrodes,
wherein the first branch electrodes extend from the first line electrode and are electrically connected to the first segment electrodes, and
wherein the second branch electrodes extend from the second line electrode and are electrically connected to the second segment electrodes.

* * * * *